(12) United States Patent
Maeto (10) Patent No.: US 11,532,321 B1
(45) Date of Patent: Dec. 20, 2022

(54) MAGNETIC DISK DEVICE AND READ/WRITE PROCESSING METHOD

(71) Applicants: Kabushiki Kaisha Toshiba, Tokyo (JP); Toshiba Electronic Devices & Storage Corporation, Tokyo (JP)

(72) Inventor: Nobuhiro Maeto, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/588,052

(22) Filed: Jan. 28, 2022

(30) Foreign Application Priority Data

Jun. 2, 2021 (JP) .............................. JP2021-092909

(51) Int. Cl.
*G11B 5/58* (2006.01)
*G11B 20/18* (2006.01)
*G11B 5/012* (2006.01)

(52) U.S. Cl.
CPC .................. *G11B 5/012* (2013.01)

(58) Field of Classification Search
CPC ............ G11B 20/1876; G11B 20/1217; G11B 20/1816; G11B 5/58; G11B 2020/12222; G11B 2020/183; G11B 20/18; G11B 5/09; G11B 27/36; G06F 11/1076; G06F 13/28; G06F 20/1833
USPC ................................................ 360/48, 49, 53
See application file for complete search history.

(56) References Cited

U.S. PATENT DOCUMENTS

| | | |
|---|---|---|
| 9,229,813 B2 * | 1/2016 | Chatradhi ........... H03M 13/612 |
| 9,983,963 B2 | 5/2018 | Li |
| 10,777,227 B2 | 9/2020 | Kashiwagi et al. |
| 10,854,239 B1 | 12/2020 | Cai et al. |

* cited by examiner

*Primary Examiner* — Nabil Z Hindi
(74) *Attorney, Agent, or Firm* — Allen & Overy LLP (57) ABSTRACT

According to one embodiment, a magnetic disk device including a disk, a head that writes data with respect to the disk and reads data from the disk, and a controller that overwrites a second track on a first track in a radial direction of the disk, performs first alternative processing of recording a first user sector in a first region when writing of the first user sector available by a user in the first track is disabled, and performs second alternative processing different from the first alternative processing of recording a first parity sector in a second region when writing of the first parity sector acquired by an XOR operation in the first track is disabled.

20 Claims, 9 Drawing Sheets

MAGNETIC DISK DEVICE AND READ/WRITE PROCESSING METHOD

CROSS-REFERENCE TO RELATED APPLICATIONS

This application is based upon and claims the benefit of priority from Japanese Patent Application No. 2021-092909, filed Jun. 2, 2021, the entire contents of which are incorporated herein by reference.

FIELD

Embodiments described herein relate generally to a magnetic disk device and a read/write processing method.

BACKGROUND

In recent years, a magnetic disk device having a technology for achieving high recording density has been developed. As a magnetic disk device that achieves high recording density, there is a magnetic disk device capable of performing a shingled recording type (shingled write magnetic recording (SMR), or shingled write recording (SWR)) in which a plurality of tracks are overwritten in a radial direction of a disk.

The magnetic disk device has a track including a parity sector obtained by performing an exclusive OR (XOR) operation on each sector of a particular track. When an error is detected in a particular sector of the track, the magnetic disk device performs error correction processing (hereinafter, may be referred to as track ECC processing) of correcting the error by an error correction code based on a parity sector corresponding to the track. In the shingled recording type magnetic disk device, it is possible to improve the track density by mounting the track ECC.

DETAILED DESCRIPTION

In general, according to one embodiment, a magnetic disk device comprising: a disk; a head that writes data with respect to the disk and reads data from the disk; and a controller that overwrites a second track on a first track in a radial direction of the disk, performs first alternative processing of recording a first user sector in a first region when writing of the first user sector available by a user in the first track is disabled, and performs second alternative processing different from the first alternative processing of recording a first parity sector in a second region when writing of the first parity sector acquired by an XOR operation in the first track is disabled.

An embodiment will be described with reference to the drawings below. The drawings are examples and the scope of the invention is not limited thereto.

Embodiment

Figure 1:
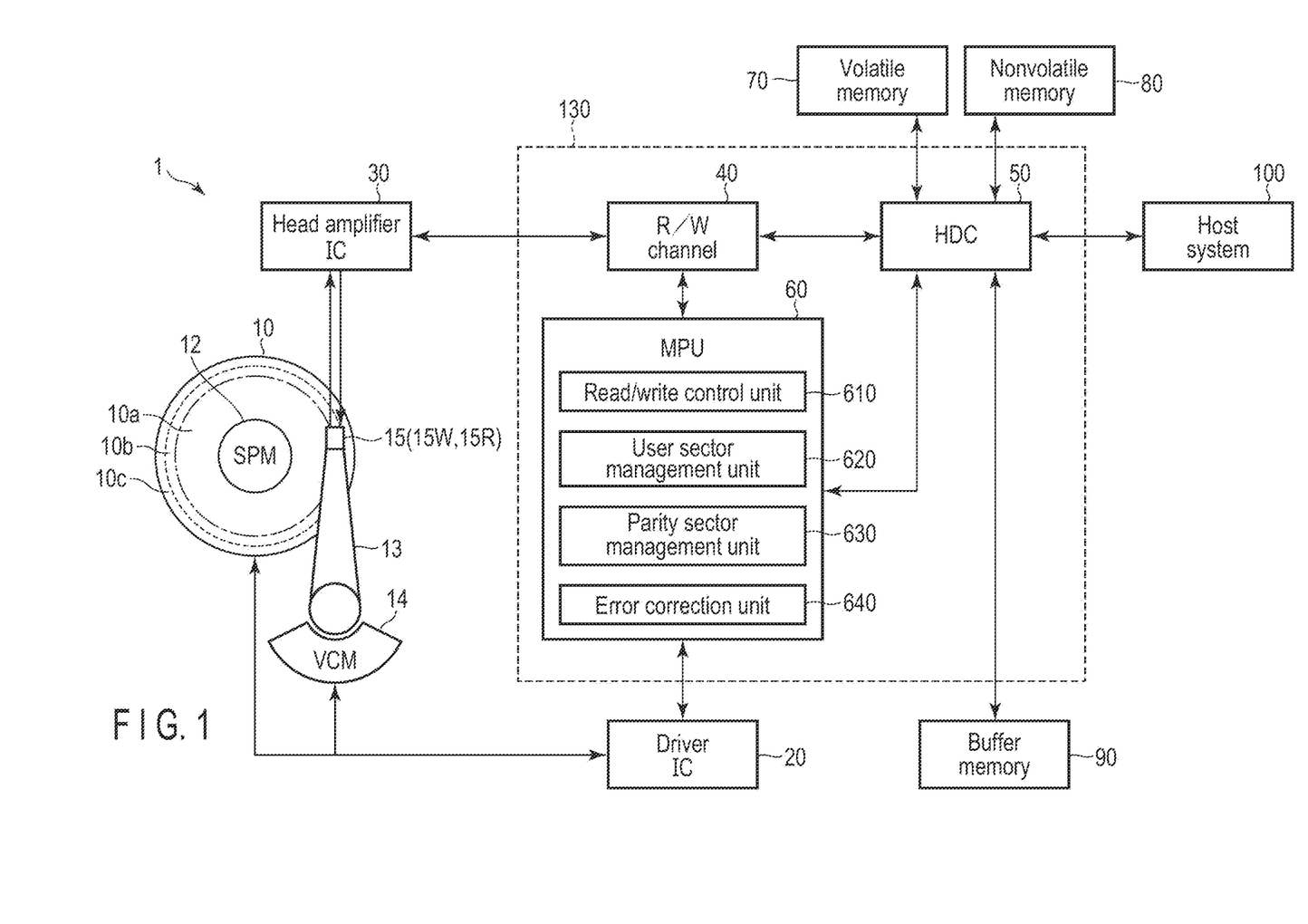
FIG. 1 is a block diagram illustrating a configuration of a magnetic disk device according to an embodiment.

FIG. 1 is a block diagram illustrating a configuration of a magnetic disk device 1 according to an embodiment.

The magnetic disk device 1 includes: a head disk assembly (HDA) described later; a driver IC 20; a head amplifier integrated circuit (hereinafter, head amplifier IC or preamplifier) 30; a volatile memory 70; a nonvolatile memory 80; a buffer memory (buffer) 90; and a system controller 130 that is an integrated circuit of one chip. The magnetic disk device 1 is connected to a host system (hereinafter, simply referred to as a host) 100.

The HDA includes: a magnetic disk (hereinafter, referred to as disk) 10; a spindle motor (hereinafter, referred to as SPM) 12; an arm 13 mounted with a head 15; and a voice coil motor (hereinafter, referred to as VCM) 14. The disk 10 is attached to the SPM 12 and rotates by driving of the SPM 12. The arm 13 and the VCM 14 compose an actuator. The actuator controls the head 15 mounted in the arm 13 to move to a particular position on the disk 10, by driving of the VCM 14. The disk 10 and the head 15 may be provided by two or more.

In the disk 10, a user data region 10a available from a user, a media cache (alternatively, may be referred to as media cache region) 10b that temporarily holds data (or a command) transferred from a host or the like before the data is written in a particular region of the user data region 10a, and a system area 10c in which information necessary for system management is written are assigned in a region where the data can be written. The media cache 10b may not be arranged on the disk 10. Hereinafter, a direction from the inner circumference to the outer circumference of the disk 10 or a direction from the outer circumference to the inner circumference of the disk 10 is referred to as a radial direction. In the radial direction, a direction from the inner circumference to the outer circumference is referred to as an outward direction (outer side), and a direction from the inner circumference to the outer circumference is referred to as an inward direction (inner side). A direction orthogonal to the radial direction of the disk 10 is referred to as a circumferential direction. The circumferential direction corresponds to a direction along the circumference of the disk 10. A particular position in the radial direction of the disk 10 may be referred to as a radial position, and a particular position in the circumferential direction of the disk 10 may be referred to as a circumferential position. The radial position and the circumferential position may be collectively referred to to simply as a position. The "track" refers to one recording region among a plurality of recording regions obtained by dividing in the radial direction of the disk 10, data written in one recording region among a plurality of recording regions obtained by dividing in the radial direction of the disk 10, a path of the head 15 at a particular radial position, data extending in the circumferential direction of the disk 10, data for one round written in a track at a particular radial position, data written in a particular track of the disk 10, a part of data written in a particular track of the disk 10, or other various meanings. The "sector" refers to one recording region among a plurality of recording regions obtained by dividing a particular track of the disk 10 in the circumferential direction, data written in one recording region among a plurality of recording regions obtained by dividing a particular track of the disk 10 in the circumferential direction, data written at a particular circumferential position at a particular radial position of the disk 10, data written in a particular sector of a particular track of the disk 10, or various other meanings. The "radial width of a track" may also be referred to as a "track width". "Path passing through a center position of a track width in a particular track" is referred to as a "track center". The data available by the user written in the user data region 10a may be referred to as user data. A sector in which the user data is written may be referred to as a user sector. A logical block address (LBA) is set in the user sector.

The head 15 includes a write head 15W and a read head 15R mounted to a slider, with the slider as a body. The write head 15W writes data in the disk 10. The read head 15R reads data written in the disk 10. The "write head 15W" may be simply referred to as a "head 15", the "read head 15R" may be simply referred to as a "head 15", or the "write head 15W and read head 15R" may be collectively referred to as a "head 15". A "center portion of the head 15" may be referred to as a "head 15", a "center portion of the write head 15W" may be referred to as a "write head 15W", and a "center portion of the read head 15R" may be referred to as a "read head 15R". A "center portion of the write head 15W" may be simply referred to as a "head 15", and a "center portion of the read head 15R" may be simply referred to as a "head 15". "Positioning the center portion of the head 15 in a track center of a particular track" may be expressed as "positioning the head 15 in a particular track", "arranging the head 15 in a particular track", "positioning the head 15 in a particular track", or the like.

Figure 2:
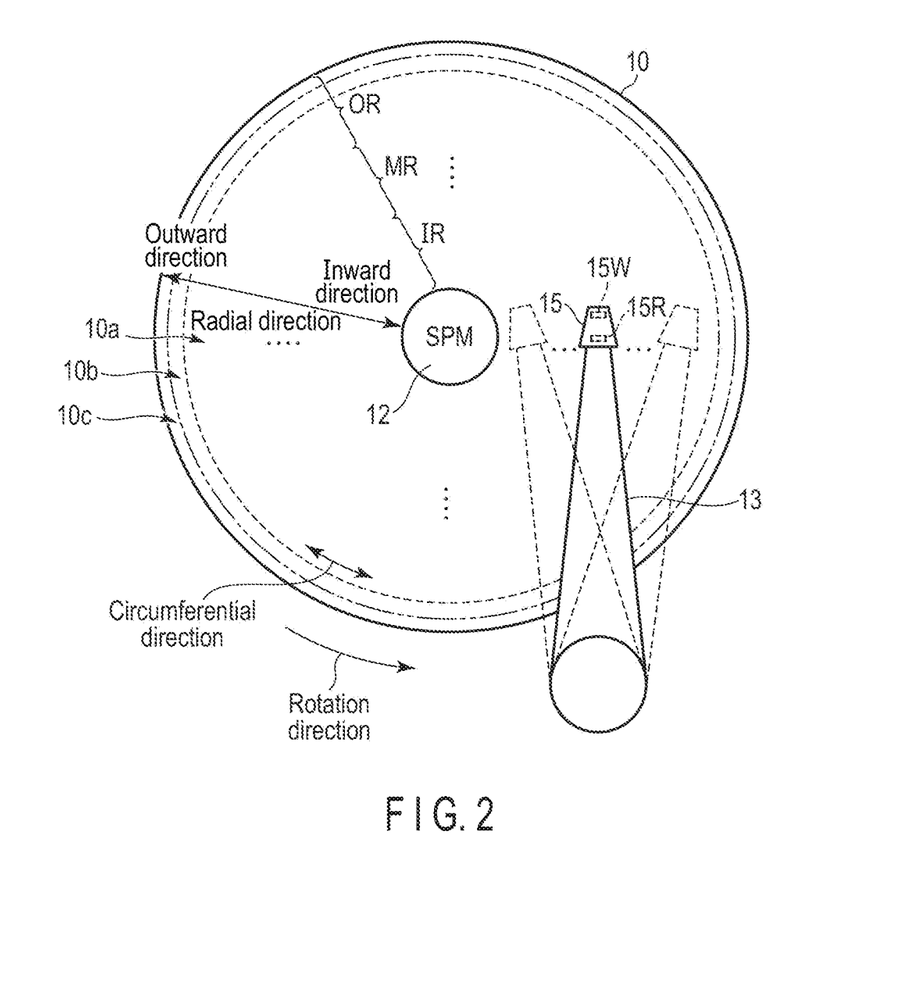
FIG. 2 is a schematic diagram illustrating an example of a disk according to an embodiment.

FIG. 2 is a schematic diagram illustrating an example of the disk 10 according to the present embodiment. As illustrated in FIG. 2, in the circumferential direction, a direction in which the disk 10 rotates is referred to as a rotation direction. In the example illustrated in FIG. 2, the rotation direction is indicated in the counterclockwise direction, but may be in the opposite direction (clockwise direction). In FIG. 2, the disk 10 is divided into an inner circumferential region IR located in the inward direction, an outer circumferential region OR located in the outward direction, and a middle circumferential region MR located between the inner circumferential region IR and the outer circumferential region OR.

In the example illustrated in FIG. 2, the disk 10 includes a user data region 10a, a media cache 10b, and a system area 10c. In FIG. 2, the user data region 10a, the media cache 10b, and the system area 10c are arranged in the described order in the outward direction. In FIG. 2, the media cache 10b is arranged adjacent to the user data region 10a in the outward direction. In other words, the media cache 10b is arranged between the user data region 10a and the system area 10c. Here, "adjacent" includes not only data, an object, a region, a space, and the like being arrayed in contact with each other, but also data, an object, a region, a space, and the like being arrayed at particular intervals. In FIG. 2, the system area 10c is arranged adjacent to the media cache 10b in the outward direction. The arrangement order of the user data region 10a, the media cache 10b, and the system area 10c is not limited to the order illustrated in FIG. 2, and may take any order. When the media cache 10b is not arranged on the disk 10, the system area 10c may be arranged adjacent to the user data region 10a in the outward direction.

In the example illustrated in FIG. 2, the user data region 10a is arranged from the inner circumferential region IR to the outer circumferential region OR in the radial direction. In the example illustrated in FIG. 2, the media cache 10b is arranged in the outer circumferential region OR in the radial direction. The media cache 10b may be located in the inner circumferential region IR or the middle circumferential region MR. The media cache 10b may be distributed and located in the outer circumferential region OR, the middle circumferential region MR, and the inner circumferential region IR. In the example illustrated in FIG. 2, the system area 10c is arranged in the outer circumferential region OR in the radial direction. In other words, the system area 10c is arranged from a particular position of the outer circumferential region OR to the outermost circumference of the disk 10. The system area 10c may be arranged in the middle circumferential region MR or the inner circumferential region IR.

In the user data region 10a of the disk 10, data can be written in a shingled recording (shingled write magnetic recording (SMR) or shingled write recording (SWR)) type in which a track to be written next is overwritten in a part in the radial direction of a particular track. In the user data region 10a, data may be written in a conventional magnetic recording (CMR) type in which a track (hereinafter, may be referred to as adjacent track) radially adjacent to a particular track is written at a particular interval (gap) in the radial direction from the particular track or data can be written at random. Hereinafter, "write data in the shingled recording type" may be simply referred to as "perform shingled recording", "perform shingled recording processing", or simply as "write". Write processing other than "normal recording processing" may be referred to as "shingled recording processing". "Write data in the normal recording type" may be simply referred to as "perform normal recording", "perform normal recording processing", or simply as "write".

As illustrated in FIG. 2, the head 15 rotates about the rotation axis by driving of the VCM 14 with respect to the disk 10, moves from the inward direction to the outward direction, and is arranged at a particular position, or moves from the outward direction to the inward direction and is arranged at a particular position.

A driver IC 20 controls driving of the SPM 12 and the VCM 14 according to control by the system controller 130 (specifically, an MPU 60 described later).

The head amplifier IC (preamplifier) 30 includes a read amplifier, a write driver, and the like. The read amplifier amplifies a read signal read from the disk 10, and outputs the read signal to the system controller 130 (specifically, a read/write (R/W) channel 40 described later). The write driver outputs a write current according to the signal output from the R/W channel 40, to the head 15.

The volatile memory 70 is a semiconductor memory in which data saved is lost when a power supply is interrupted. The volatile memory 70 stores data required for processing by each unit in the magnetic disk device 1, and the like. The volatile memory 70 is, for example, a dynamic random access memory (DRAM), or a synchronous dynamic random access memory (SDRAM).

The nonvolatile memory 80 is a semiconductor memory that records data saved even when a power supply is interrupted. The nonvolatile memory 80 is, for example, a flash read only memory (ROM) (FROM) of an NOR type or an NAND type.

The buffer memory 90 is a semiconductor memory that temporarily records data transmitted and received between the magnetic disk device 1 and the host 100, and the like. The buffer memory 90 may be configured integrally with the volatile memory 70. The buffer memory 90 is, for example, the DRAM, a static random access memory (SRAM), the SDRAM, a ferroelectric random access memory (FeRAM), or a magnetoresistive random access memory (MRAM).

The system controller (controller) 130 is, for example, realized by using a large-scale integration (LSI) called a System-on-a-Chip (SoC) in which a plurality of elements are integrated in a single chip. The system controller 130 includes a read/write (R/W) channel 40, a hard disk controller (HDC) 50, and a microprocessor (MPU) 60. The system controller 130 is, electrically connected to, for example, the driver IC 20, the head amplifier IC 30, the volatile memory 70, the nonvolatile memory 80, the buffer memory 90, and the host system 100.

The R/W channel 40 performs signal processing of data (hereinafter, may be referred to as read data) transferred from the disk 10 to the host 100 and data (hereinafter, may be referred to as write data) transferred from the host 100 according to an instruction from the MPU 60 as described later. The R/W channel 40 has a circuit or a function of modulating write data. The R/W channel 40 has a circuit or a function of measuring and demodulating the signal quality of the read data. The R/W channel 40 is electrically connected to the head amplifier IC 30, the HDC 50, and the MPU 60.

The HDC 50 controls data transfer. For example, the HDC 50 controls data transfer between the host 100 and the disk 10 according to an instruction from the MPU 60 as described later. The HDC 50 is electrically connected to, for example, the R/W channel 40, the MPU 60, the volatile memory 70, the nonvolatile memory 80, and the buffer memory 90.

The MPU 60 is a main controller that controls each unit of the magnetic disk device 1. The MPU 60 performs servo control for controlling the VCM 14 via the driver IC 20 and positioning the head 15. The MPU 60 controls the SPM 12 via the driver IC 20 to rotate the disk 10. The MPU 60 controls write operation of data to the disk 10, and selects data forwarded from the host 100, for example, a destination to save of the write data. The MPU 60 controls read operation of data from the disk 10 and controls processing of data transferred from the disk 10 to the host 100, for example, read data. The MPU 60 manages a region in which data is recorded. The MPU 60 is connected to each unit of the magnetic disk device 1. The MPU 60 is electrically connected to, for example, the driver IC 20, the R/W channel 40, and the HDC 50.

The MPU 60 includes a read/write control unit 610, a user sector management unit 620, a parity sector management unit 630, an error correction unit 640, and the like. The MPU 60 performs processing of each unit, for example, the read/write control unit 610, the user sector management unit 620, the parity sector management unit 630, the error correction unit 640, and the like on firmware. The MPU 60 may include each unit, for example, the read/write control unit 610, the user sector management unit 620, the parity sector management unit 630, the error correction unit 640, and the like as a circuit. The read/write control unit 610, the user sector management unit 620, the parity sector management unit 630, the error correction unit 640, and the like may be included in the R/W channel 40 or the HDC 50.

The read/write control unit 610 controls read processing of reading data from the disk 10 and write processing of writing data to the disk 10 according to a command or the like from the host 100. The read/write control unit 610 controls the VCM 14 via the driver IC 20, positions the head 15 at a particular position on the disk 10, and performs read processing or write processing. Hereinafter, the term "access" may be used in a sense including recording or writing data in a particular region (or write processing), reading or reading data from a particular region (or read processing), or moving the head 15 or the like to a particular region.

The read/write control unit 610 performs shingled recording of data for each particular region of the disk 10 according to a command or the like from the host 100. A unit of a region where shingled recording of data is performed may be referred to as a band (or band region). The read/write control unit 610 sequentially performs shingled recording a plurality of tracks in the band region. Note that the read/write control unit 610 may normally record data in a particular region of the disk 10 according to a command or the like from the host 100.

When a write fault occurs at the time of writing (or shingled recording of) data to a particular region, for example, a particular sector, the read/write control unit 610 performs write retry of writing data that cannot be written due to the occurrence of the write fault to the same sector again. Terms such as "same", "identical", "match", and "equivalent" include not only the meaning of exactly the same but also the meaning of being different to an extent that can be regarded as being substantially the same. In a case where a write fault occurs at the time of writing (or shingled recording of) data to a particular region, for example, a particular sector, the read/write control unit 610 determines whether the number of times (hereinafter, may be referred to as the number of write retries) of performing the write retry exceeds an upper limit value (hereinafter, may be referred to as a write retry upper limit value) of the number of times the write retry can be performed or is equal to or less than the write retry upper limit value. When the read/write control unit 610 determines that the number of write retries is equal to or less than the write retry upper limit value, the read/write control unit 610 performs the write retry.

In the shingled recording processing, the upper limit value (hereinafter, may be referred to as a write retry upper limit value) of the number of times write retry can be performed can be set to a small value due to track density design. For example, in the shingled recording processing, the write retry upper limit value is once. For example, in the shingled recording processing, the write retry upper limit value is several times or less.

Figure 3:
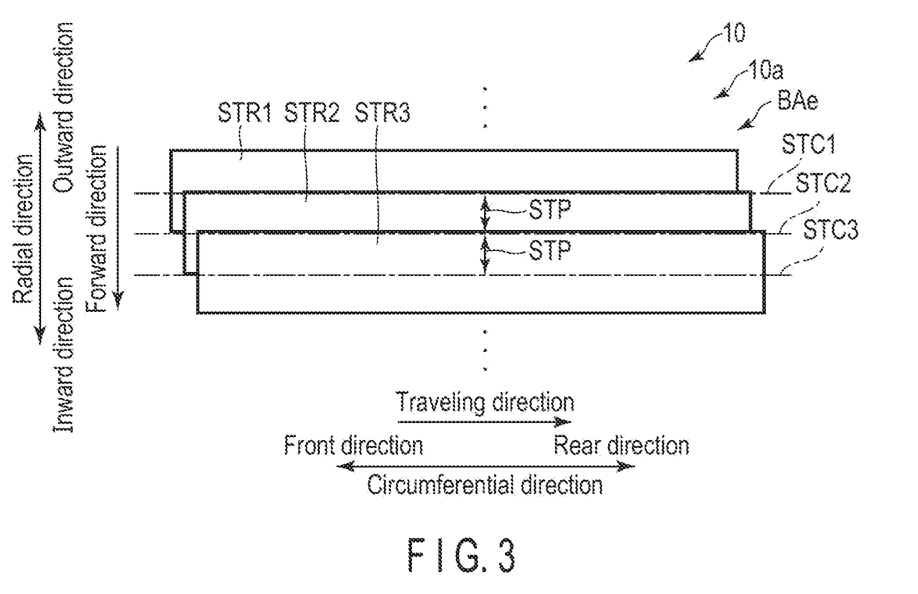
FIG. 3 is a schematic diagram illustrating an example of shingled recording processing.

FIG. 3 is a schematic diagram illustrating an example of shingled recording processing. FIG. 3 illustrates a traveling direction. A direction in which the head 15 sequentially writes and reads data with respect to the disk 10 in the circumferential direction, that is, a direction in which the head 15 travels with respect to the disk 10 in the circumferential direction may be referred to as a traveling direction. For example, the traveling direction is opposite to the rotation direction of the disk 10. The traveling direction may be the same direction as the rotation direction of the disk 10. In the circumferential direction, the traveling direction may be referred to as rear direction or rear. In the circumferential direction, a direction opposite to the rear direction may be referred to as front direction or front. FIG. 3 illustrates a forward direction. A direction in which shingled recording of a plurality of tracks are continuously performed in the radial direction, that is, a direction in which a track to be written next is overlapped with a track written one ahead in the radial direction may be referred to as a forward direction. In FIG. 3, the inward direction is the forward direction in the radial direction, but the outward direction may be the forward direction.

FIG. 3 illustrates a band region BAe. In the band region BAe of FIG. 3, a plurality of tracks STR1, STR2, and STR3 are continuously overwritten in the forward direction in the described order. Hereinafter, in the shingled recording, a region in which data is written by the write head 15W may be referred to as a write track, and a remaining region other than a region in which another write track is overwritten in a particular track may be referred to as a read track. FIG. 3 illustrates a track center STC1 of the track STR1 in a case where another track is not overwritten, a track center STC2 of the track STR2 in a case where another track is not overwritten, and a track center STC3 of the track STR3 in a case where another track is not overwritten. In the example illustrated in FIG. 3, the tracks STR1, STR2, and STR3 are written at a track pitch STP. The track center STC1 of the track STR1 and the track center STC2 of the track STR2 are separated by the track pitch STP. The track center STC2 of the track STR2 and the track center STC3 of the track STR3 are separated by the track pitch STP. The tracks STR1 to STR3 may be written at different track pitches. In FIG. 3, the radial width of the region where the track STR2 is not overwritten in the track STR1 and the radial width of the region where the track STR3 is not overwritten in the track STR2 are the same. Note that the radial width of the region where the track STR2 is not overwritten in the track STR1 and the radial width of the region where the track STR3 is not overwritten in the track STR2 may be different from each other. In FIG. 3, for convenience of description, each track is illustrated in a rectangular shape extending in the circumferential direction with a particular track width, but is actually curved along the circumferential direction. Each track may have a wave shape extending in the circumferential direction while varying in the radial direction. In FIG. 3, three tracks are overwritten, but less than three tracks or more than three tracks may be overwritten.

In the example illustrated in FIG. 3, the MPU 60 sequentially performs shingled recording of the tracks STR1 to STR3 in the band region BAe in the inward direction at the track pitch STP. The MPU 60 may sequentially perform shingled recording of the tracks STR1 to STR3 in the outward direction at the track pitch STP. The MPU 60 writes the track STR2 at the track pitch STP in the inward direction of the track STR1 and overwrites the track STR2 in a part of the inward direction of the track STR1. The MPU 60 writes the track STR3 at the track pitch STP in the inward direction of the track STR2, and overwrites the track STR3 in a part of the inward direction of the track STR2.

Figure 4:
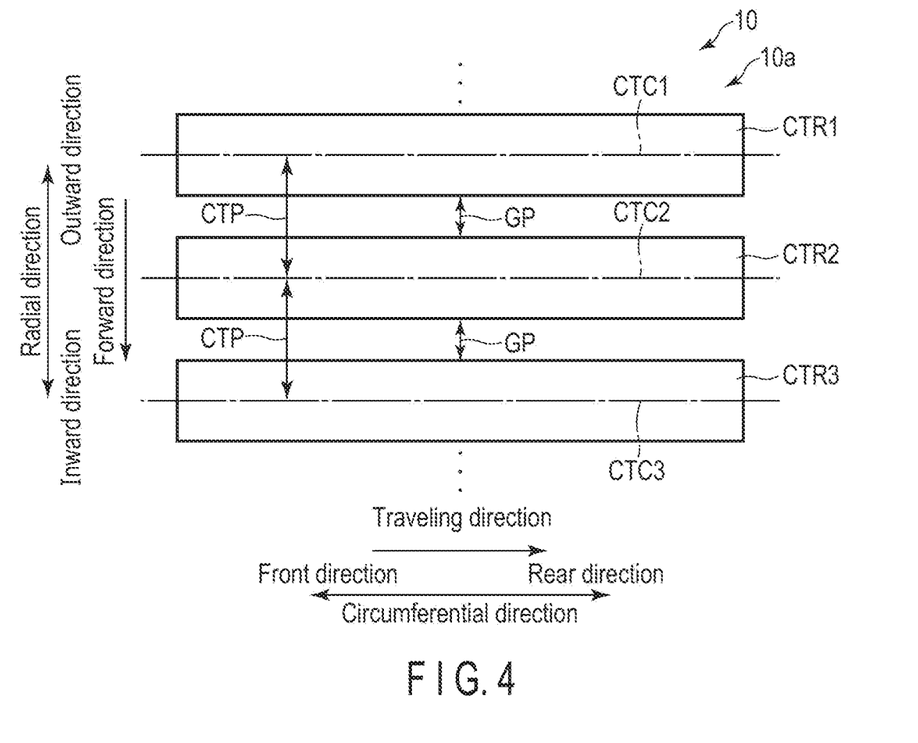
FIG. 4 is a schematic diagram illustrating an example of normal recording processing.

FIG. 4 is a schematic diagram illustrating an example of normal recording processing. FIG. 4 illustrates tracks CTR1, CTR2, and CTR3. In FIG. 4, for example, the track widths of the tracks CTR1, CTR2, and CTR3 are the same. The track widths of the tracks CTR1 to CTR3 may be different. FIG. 4 illustrates the track center CTC1 of the track CTR1, the track center CTC2 of the track CTR2, and the track center CTC3 of the track CTR3. In the example illustrated in FIG. 4, the tracks CTR1, CTR2, and CTR3 are written at the track pitch CTP. The track center CTC1 of the track CTR1 and the track center CTC2 of the track CTR2 are separated by a track pitch CTP. The track center CTC2 of the track CTR2 and the track center CTC3 of the track CTR3 are separated by a track pitch CTP. The track CTR1 and the track CTR2 are separated by a gap GP. The track CTR2 and the track CTR3 are separated by the gap GP. The tracks CTR1 to CTR3 may be written at different track pitches. In FIG. 4, for convenience of description, each track is illustrated in a rectangular shape extending in the circumferential direction with a particular track width, but is actually curved along the circumferential direction. Each track may have a wave shape extending in the circumferential direction while varying in the radial direction.

In the example illustrated in FIG. 4, the MPU 60 positions the head 15 at the track center CTC1 in a particular region of the disk 10, for example, the user data region 10a, and normally records the track CTR1 or a particular sector of the track CTR1. In the user data region 10a, the MPU 60 positions the head 15 at the track center CTC2 separated from the track center CTC1 of the track CTR1 in the inward direction at the track pitch CTP, and normally records the track CTR2 or a particular sector of the track CTR2. In the user data region 10a, the MPU 60 positions the head 15 at the track center CTC3 separated from the track center CTC2 of the track CTR2 in the inward direction at the track pitch CTP, and normally records the track CTR3 or a particular sector of the track CTR3. The MPU 60 may sequentially and normally record the tracks CTR1, CTR2, and CTR3 in a particular region of the disk 10, for example, the user data region 10a, or may randomly and normally record the tracks CTR1, CTR2, and CTR3 in a particular sector of the track CTR1, a particular sector of the track CTR2, and a particular sector of the track CTR3.

The user sector management unit 620 manages a particular sector of the disk 10, for example, a user sector. The user sector management unit 620 manages an LBA corresponding to a particular user sector of the disk 10 and data to be written in the particular user sector, for example, user data. The user sector management unit 620 may record a relationship among a particular user sector, an LBA corresponding to the particular user sector, and user data to be written in the particular user sector as a table in the disk 10, the volatile memory 70, the nonvolatile memory 80, the buffer memory 90, and the like.

The user sector management unit 620 writes particular user data in a particular user sector corresponding to a particular LBA according to a command of the host 100 or the like. The user sector management unit 620 is arranged over a plurality of tracks in the band region according to a command of the host 100 or the like, and performs shingled recording of the user data in a plurality of user sectors corresponding to a plurality of consecutive LBAs according to the order of the LBAs.

In a case where write fault occurs in a particular user sector (hereinafter, may be referred to as a fault sector) of a particular track and writing to the fault sector is disabled when shingled recording of the user data is performed in the particular track of the band region, the user sector management unit 620 performs alternative processing (hereinafter, may be referred to as user sector alternative processing) of performing shingled recording of the user data (hereinafter, may be referred to as fault write data) to be written in the fault sector and the user data subsequent to the fault write data in the user data region 10a different from the fault sector.

In a case where a write fault occurs in a fault sector of a particular track and writing to the fault sector is disabled when shingled recording of the user data is performed in the particular track of the band region, the user sector management unit 620 performs shingled recording (or resumes shingled recording) of the fault write data and the user data subsequent to the fault write data from a user sector (hereinafter, may be referred to as a circumferential sector) arranged subsequent to the fault sector. In other words, in a case where a write fault occurs in a fault sector of a particular track and writing to the fault sector is disabled when the shingled recording of the user data is performed in the particular track of the band region, the user sector management unit 620 performs shingled recording (or resumes shingled recording) of the user data subsequent to the fault write data from the fault write data from the circumferential sector subsequently deviated from the fault sector to the user sector subsequent to the circumferential sector.

In a case where a write fault occurs in a fault sector of a particular track and writing to the fault sector is disabled when shingled recording of the user data is performed in the particular track of the band region, the user sector management unit 620 performs shingled recording (or resumes shingled recording) of the fault write data and the user data subsequent to the fault write data from the circumferential sector corresponding to the LBA in which the LBA corresponding to the fault sector is incremented by a particular value. In other words, in a case where a write fault occurs in a fault sector of a particular track and writing to the fault sector is disabled when shingled recording of the user data is performed in the particular track of the band region, the user sector management unit 620 performs shingled recording (or resumes shingled recording) of the fault write data and the user data subsequent to the fault write data from the circumferential sector corresponding to the LBA in which the LBA of the fault sector is incremented by a particular value to the user sector subsequent to the circumferential sector.

In a case where a write fault occurs in a fault sector of a particular track and writing to the fault sector is disabled when shingled recording of the user data is performed in the particular track of the band region, the user sector management unit 620 performs shingled recording (or resumes shingled recording) of the fault write data and the user data subsequent to the fault write data from a user sector (hereinafter, may be referred to as a circumferential adjacent sector) subsequently adjacent to the fault sector. In other words, in a case where a write fault occurs in a fault sector of a particular track and writing to the fault sector is disabled when the shingled recording of the user data is performed in the particular track of the band region, the user sector management unit 620 performs shingled recording (or resumes shingled recording) of the user data subsequent to the fault write data from the fault write data from the circumferential adjacent sector subsequently deviated by one sector from the fault sector to the user sector subsequent to the circumferential adjacent sector.

In a case where a write fault occurs in a fault sector of a particular track and writing to the fault sector is disabled when shingled recording of the user data is performed in the particular track of the band region, the user sector management unit 620 performs shingled recording (or resumes shingled recording) of the fault write data and the user data subsequent to the fault write data from the circumferential adjacent sector corresponding to the LBA in which the LBA corresponding to the fault sector is incremented by one. In other words, in a case where a write fault occurs in a fault sector of a particular track and writing to the fault sector is disabled when shingled recording of the user data is performed in the particular track of the band region, the user sector management unit 620 performs shingled recording (or resumes shingled recording) of the fault write data and the user data subsequent to the fault write data from the circumferential adjacent sector corresponding to the LBA in which the LBA of the fault sector is incremented by one to the user sector subsequent to the circumferential adjacent sector.

When a write fault occurs in a particular fault sector in the band region when shingled recording of the user data is performed in the band region, the user sector management unit 620 determines whether the number of write retries exceeds the write retry upper limit value or is equal to or less than the write retry upper limit value.

When the user sector management unit 620 determines that the number of write retries exceeds the write retry upper limit value, the user sector management unit 620 performs shingled recording (or resumes shingled recording) of the fault write data to be written from the circumferential sector arranged subsequent to the fault sector to the fault sector and the user data subsequent to the fault write data. In other words, when the user sector management unit 620 determines that the number of write retries exceeds the write retry upper limit value, the user sector management unit 620 performs shingled recording of the user data subsequent to the fault write data from the fault write data to the user sector subsequent to the fault sector from the circumferential sector later deviated from the fault sector to the user sector subsequent to the circumferential sector.

When the user sector management unit 620 determines that the number of write retries exceeds the write retry upper limit value, the user sector management unit 620 performs shingled recording (or resumes shingled recording) of the fault write data from the circumferential sector corresponding to the LBA in which the LBA corresponding to the fault sector is incremented by a particular value and the user data subsequent to the fault write data. In other words, when the user sector management unit 620 determines that the number of write retries exceeds the write retry upper limit value, the user sector management unit 620 performs shingled recording of the user data subsequent to the fault write data from the fault write data from the circumferential sector corresponding to the LBA obtained by incrementing the LBA of the fault sector by a particular value to the user sector subsequent to the circumferential sector.

When the user sector management unit 620 determines that the number of write retries exceeds the write retry upper limit value, the user sector management unit 620 performs shingled recording (or resumes shingled recording) of the fault write data and the user data subsequent to the fault write data from the circumferential adjacent sector subsequently adjacent to the fault sector. In other words, when the user sector management unit 620 determines that the number of write retries exceeds the write retry upper limit value, the user sector management unit 620 performs shingled recording of the user data subsequent to the fault write data from the fault write data to the user sector subsequent to the fault sector from the circumferential adjacent sector later deviated by one sector from the fault sector to the user sector subsequent to the circumferential adjacent sector.

When the user sector management unit 620 determines that the number of write retries exceeds the write retry upper limit value, the user sector management unit 620 performs shingled recording (or resumes shingled recording) of the fault write data from the circumferential adjacent sector corresponding to the LBA in which the LBA corresponding to the fault sector is incremented by one and the user data subsequent to the fault write data. In other words, when the user sector management unit 620 determines that the number of write retries exceeds the write retry upper limit value, the user sector management unit 620 performs shingled recording of the user data subsequent to the fault write data from the fault write data from the circumferential adjacent sector corresponding to the LBA obtained by incrementing the LBA of the fault sector by one to the user sector subsequent to the circumferential adjacent sector.

Hereinafter, when a write fault occurs in the fault sector and writing in the fault sector is disabled, writing the fault write data to the user data subsequent to the fault write data from the circumferential adjacent sector subsequently deviated from, for example, subsequent by one sector to the fault sector to the user sector subsequent to the circumferential adjacent sector may be referred to as sector slip or sector slip processing.

The parity sector management unit 630 manages a particular parity sector (or parity data) of the disk 10. The parity sector management unit 630 calculates a parity sector by performing an exclusive OR (XOR) operation, writes the calculated parity sector in a particular region of the disk 10, for example, a region in which an LBA is not set (hereinafter, may be referred to as an LBA unset region), and manages the parity sector. The parity sector includes, for example, a parity bit and a parity detection code. The parity sector management unit 630 may record the relationship between a particular parity sector and the LBA unset region corresponding to the particular parity sector as a table in the disk 10, the volatile memory 70, the nonvolatile memory 80, the buffer memory 90, and the like.

The parity sector management unit 630 performs an XOR operation on all sectors of a particular track to calculate parity sectors, and writes the calculated parity sectors to a particular sector (hereinafter, may be referred to as a parity write sector) of this track. No LBA is set in the parity write sector. The parity sector management unit 630 may calculate a parity sector by performing an XOR operation on some sectors of a particular track and write the calculated parity sector in a parity write sector of this track.

The parity sector management unit 630 performs an XOR operation on the user data written in all sectors (hereinafter, may be referred to as an effective sector) other than the fault sector in a particular track to calculate a parity sector, and writes the calculated parity sector in the parity write sector of this track.

In a case where a write fault occurs in a parity write sector (hereinafter, may be referred to as a fault parity write sector) of a particular track of the band region and writing to the fault parity write sector is disabled when shingled recording of the user data is performed in the band region, the parity sector management unit 630 performs alternative processing (hereinafter, may be referred to as parity sector alternative processing) of recording (or saving) a parity sector (hereinafter, may be referred to as fault parity sector) to be written in the fault parity write sector in a region (hereinafter, may be referred to as non-user data region or an alternative region) other than the user data region 10*a* different from the fault parity write sector. No LBA is set in the alternative region. The parity sector alternative processing and the user sector alternative processing described above are different alternative processes. Hereinafter, the parity sector alternative processing and the user sector alternative processing may be collectively referred to as alternative processing. The alternative processing includes processing of recording particular data in a region different from a region in which the data is scheduled to be written. The non-user data region (or alternative region) includes, for example, the media cache 10*b*, the system area 10*c*, the nonvolatile memory 80, and the like of the disk 10. In a case where a write fault occurs in a parity write sector of a particular track of the band region and writing to the fault parity write sector is disabled, a method of not writing an adjacent track adjacent in the forward direction of the particular track is conceivable, but there is a possibility that the user data region 10*a* for one track is lost.

In a case where a write fault occurs in a fault parity write sector of a particular track of the band region and writing to the fault parity write sector is disabled when shingled recording of the user data is performed in the particular track of the band region, the parity sector management unit 630 records (or saves) the fault parity sector in an alternative region, for example, (a specific area (hereinafter, may be referred to as parity recording area) for recording a parity sector of) the system area 10*c* of the disk 10.

When a write fault occurs in a particular fault parity write sector in the band region when shingled recording of the user data is performed in a particular track in the band region, the parity sector management unit 630 determines whether the number of write retries exceeds the write retry upper limit value or is equal to or less than the write retry upper limit value.

When the parity sector management unit 630 determines that the number of write retries exceeds the write retry upper limit value, the parity sector management unit 630 records (or saves) the fault parity sector in an alternative region, for example, (the parity recording region of) the system area 10*c* of the disk 10.

The error correction unit 640 recovers (corrects, relieves, or performs error correction of) unreadable data (hereinafter, may be referred to as read error data or error data) or an unreadable sector (hereinafter, may be referred to as a read error sector or an error sector). The error correction unit 640 performs read retry of reading error data or an error sector a plurality of times. The error correction unit 640 performs processing (hereinafter, may be referred to as ECC processing or error correction processing) of correcting an error of data or a sector based on an error correction code. The error correction unit 640 performs ECC processing (hereinafter, may be referred to as sector ECC processing) on the error sector based on error data of a particular track or an ECC (hereinafter, may be referred to as sector ECC) corresponding to the error sector. The error correction unit 640 performs ECC processing (hereinafter, may be referred to as track ECC processing) on the error sector based on error data of a particular track or an ECC (hereinafter, may be referred to as track ECC) corresponding to the error sector. For example, the error correction unit 640 performs track ECC processing on an error sector of a particular track based on parity data or a parity sector corresponding to the track. For example, the error correction unit 640 may record information (hereinafter, may be referred to as error sector information) related to the error sector as a table in a particular recording region, for example, the disk 10, the volatile memory 70, or the nonvolatile memory 80.

In a case where the track ECC processing is performed on a particular error sector in a particular track, the error correction unit 640 determines whether the parity alternative processing has been performed or the parity alternative processing has not been performed in this track. When the error correction unit 640 determines that the parity alternative processing has been performed in the particular track, the error correction unit 640 reads the parity sector corresponding to the track from the alternative region, and performs the track ECC processing on the error sector of the track based on the parity sector.

Figure 5:
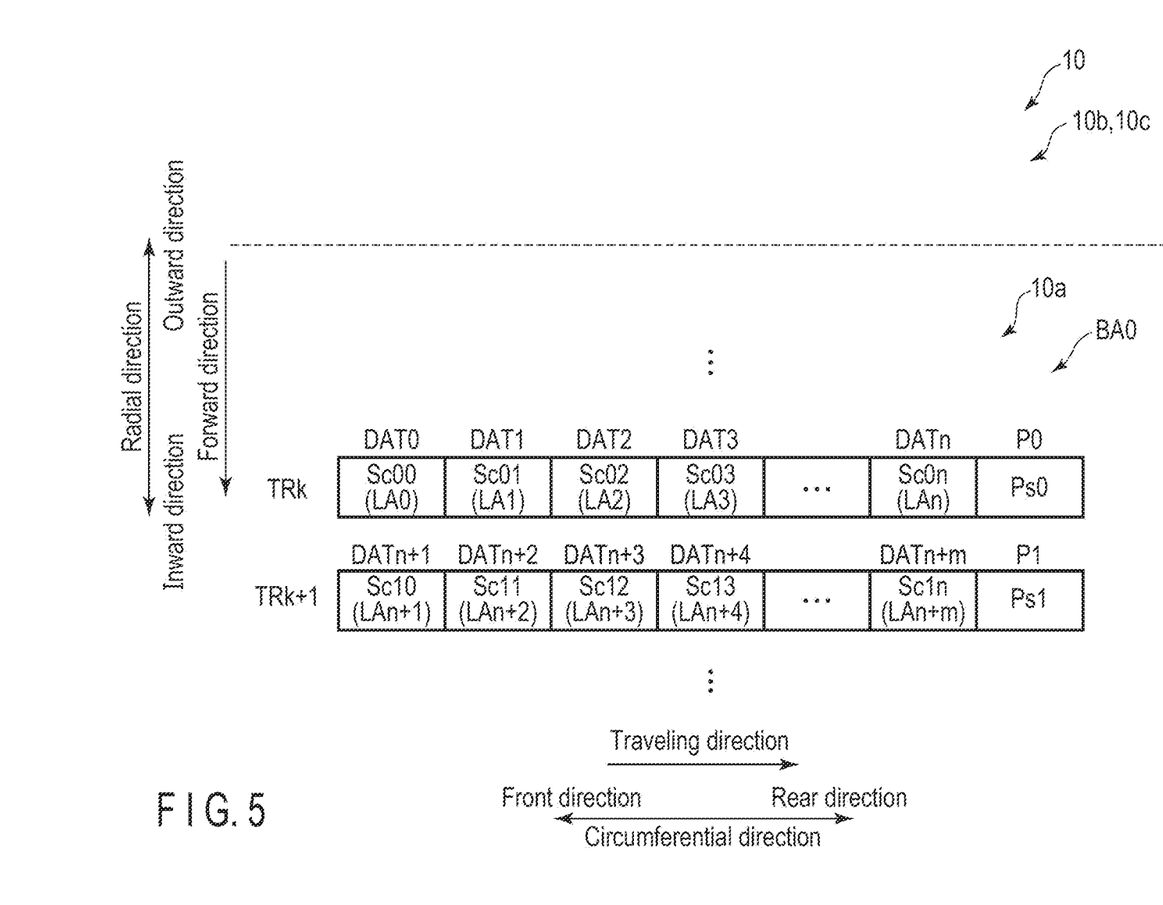
FIG. 5 is a schematic diagram illustrating an example of a plurality of tracks on which shingled recording is performed in a band region in a case where sector slip processing is not performed.

FIG. 5 is a schematic diagram illustrating an example of a plurality of shingled recorded tracks TRk and TRk+1 of a band region BAO in a case where the sector slip processing is not performed. FIG. 5 illustrates the band region BAO. In the band region BAO, shingled recording of the track TRk and the track TRk+1 is performed in the forward direction in the described order. Shingled recording of three or more tracks may be performed in the forward direction in the band region BAO. The track TRk includes user sectors Sc00, Sc01, Sc02, Sc03, . . . , Sc0n, and a parity write sector Ps0. In the track TRk, the user sectors Sc00, Sc01, Sc02, Sc03, . . . , Sc0n, and the parity write sector Ps0 are continuously arranged in the traveling direction in the described order. The parity write sector Ps0 is subsequently adjacent to the last user sector Sc0n among all the user sectors in the track TRk. LBA LA0 is set to the user sector Sc00, LBA LA1 is set to the user sector Sc01, LBA LA2 is set to the user sector Sc02, LBA LA3 is set to the user sector Sc03, and LBA LAn is set to the user sector Sc0n.

FIG. 5 illustrates user data DAT0, DAT1, DAT2, DAT3, . . . , and DATn written in the track TRk. FIG. 5 illustrates the parity sector P0 written in the parity write sector Ps0 of the track TRk. The track TRk+1 includes user sectors Sc10, Sc11, Sc12, Sc13, . . . , Sc1n, and a parity write sector Ps1. In the track TRk, the user sectors Sc10, Sc11, Sc12, Sc13, . . . , Sc1n, and the parity write sector Ps1 are continuously arranged in the traveling direction in the described order. The parity write sector Ps1 is adjacent to the last user sector Sc1n in the track TRk+1. LBA LAn+1 is set to the user sector Sc10, LBA LAn+2 is set to the user sector Sc11, LBA LAn+3 is set to the user sector Sc12, LBA LAn+3 is set to the user sector Sc13, and LBA LAn+m is set to the user sector Sc1n. FIG. 5 illustrates user data DATn+1, DATn+2, DATn+3, . . . , and DATn+m written in the track TRk+1. FIG. 5 illustrates the parity sector P1 written in the parity write sector Ps1 of the track TRk+1.

In the track TRk, the MPU 60 performs shingled recording of DAT0 to DATn in the user sectors Sc00 to Sc0n, respectively, and writes the parity sector P0 acquired by performing the XOR operation on DAT0 to DATn to the parity write sector Ps0. In the track TRk+1, the MPU 60 performs shingled recording of DATn+1 to DATn+m in the user sectors Sc10 to Sc1n, respectively, and writes the parity sector P1 acquired by performing the XOR operation on DATn+1 to DATn+m to the parity write sector Ps1.

Figure 6:
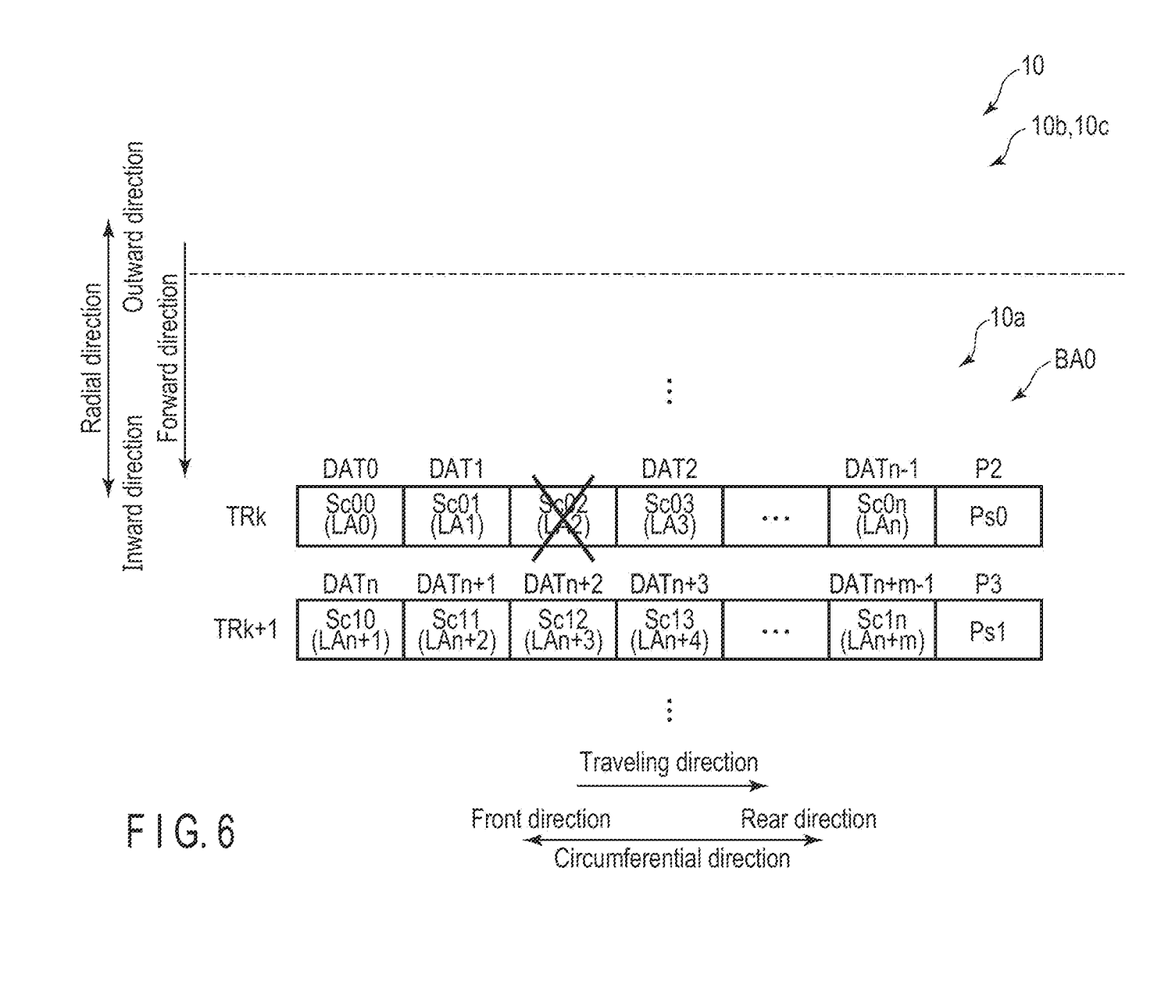
FIG. 6 is a schematic diagram illustrating an example of a plurality of tracks on which shingled recording is performed in a band region in a case where sector slip processing is performed.

FIG. 6 is a schematic diagram illustrating an example of a plurality of shingled recorded tracks TRk and TRk+1 of the band region BAO in a case where the sector slip processing is performed. FIG. 6 corresponds to FIG. 5. In FIG. 6, the user sector Sc02 corresponds to a fault sector. FIG. 6 illustrates the user data DATn−1 written in the track TRk and the user data DATn+m−1 written in the track TRk+1. FIG. 6 illustrates a parity sector P2 written in the parity write sector Ps0 of the track TRk and a parity sector P3 written in the parity write sector Ps1 of the track TRk+1. In FIG. 6, it is assumed that the number of write retries exceeds the write retry upper limit value.

In the example illustrated in FIG. 6, in a case where a write fault occurs in the user sector Sc02 and writing to the fault sector is disabled when shingled recording of the track TRk is performed, the MPU 60 performs shingled recording of DAT2 in the user sector Sc03, shingled recording of DATn−1 in the user sector Sc0n, and writes the parity sector P2 acquired by performing the XOR operation on DAT0 to DATn−1 to the parity write sector Ps0. In the track TRk+1, the MPU 60 performs shingled recording of DATn to DATn+m−1 in the user sectors Sc10 to Sc1n, respectively, and writes the parity sector P3 acquired by performing the XOR operation on DATn to DATn+m−1 to the parity write sector Ps1.

Figure 7:
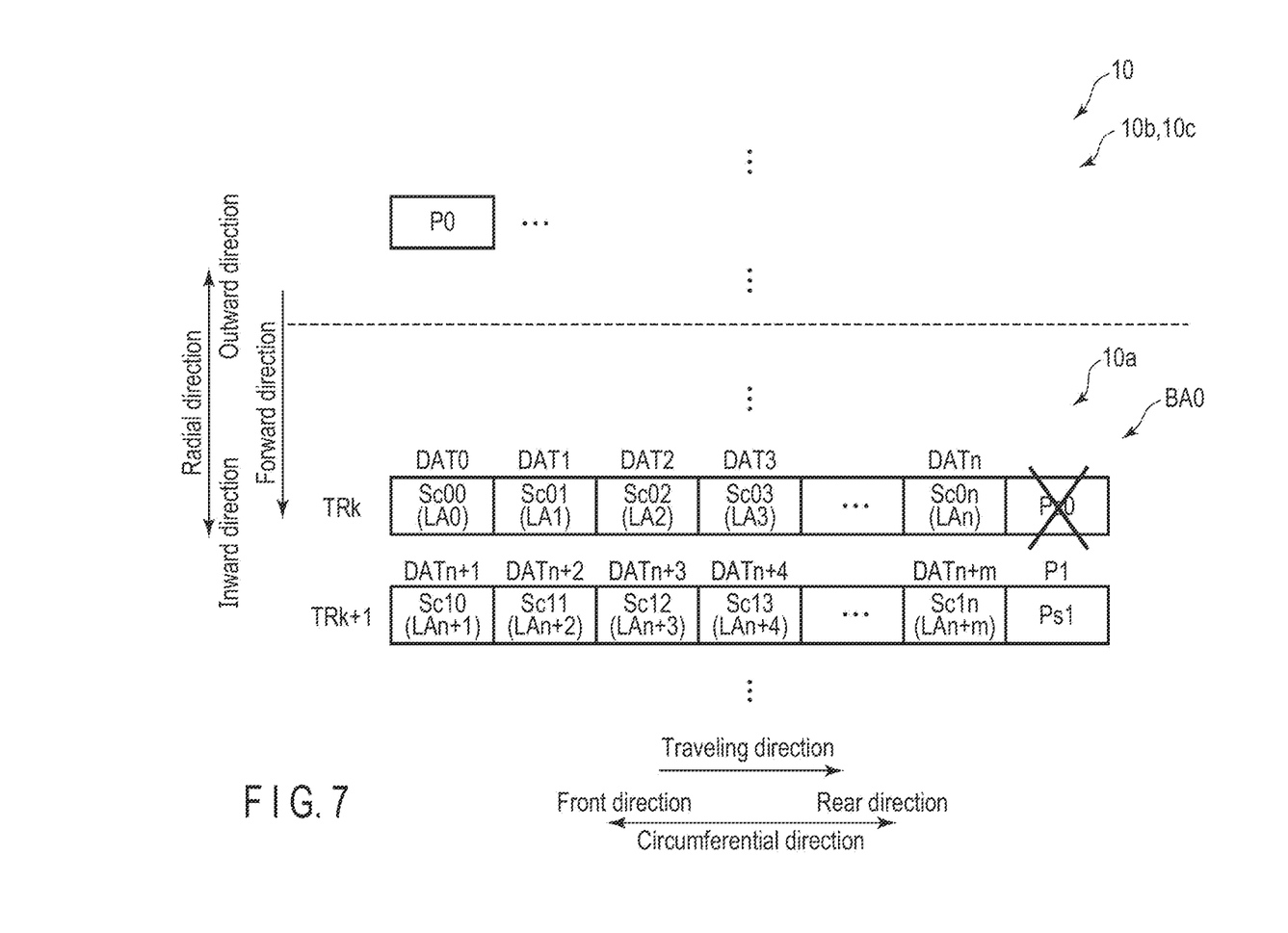
FIG. 7 is a schematic diagram illustrating an example of parity sector alternative processing according to the embodiment.

FIG. 7 is a schematic diagram illustrating an example of parity sector alternative processing according to the embodiment. FIG. 7 corresponds to FIG. 5. In FIG. 7, the parity write sector Ps0 corresponds to a fault parity write sector. FIG. 7 illustrates the media cache 10b and the system area 10c of the disk 10 as an alternative region. In FIG. 7, it is assumed that the number of write retries exceeds the write retry upper limit value.

In the example illustrated in FIG. 7, in a case where a write fault occurs in the parity write sector Ps0 of the track TRk and writing to the parity write sector is disabled, the MPU 60 records the parity sector P0 in (the parity recording region of) the media cache 10b or the system area 10c.

In the example illustrated in FIG. 7, when performing the track ECC processing on the error sector of the track TRk, the MPU 60 reads the parity sector P0 from (the parity recording region of) the media cache 10b or the system area 10c, and performs the track ECC processing on the error sector of the track TRk based on the parity sector P0.

Figure 8:
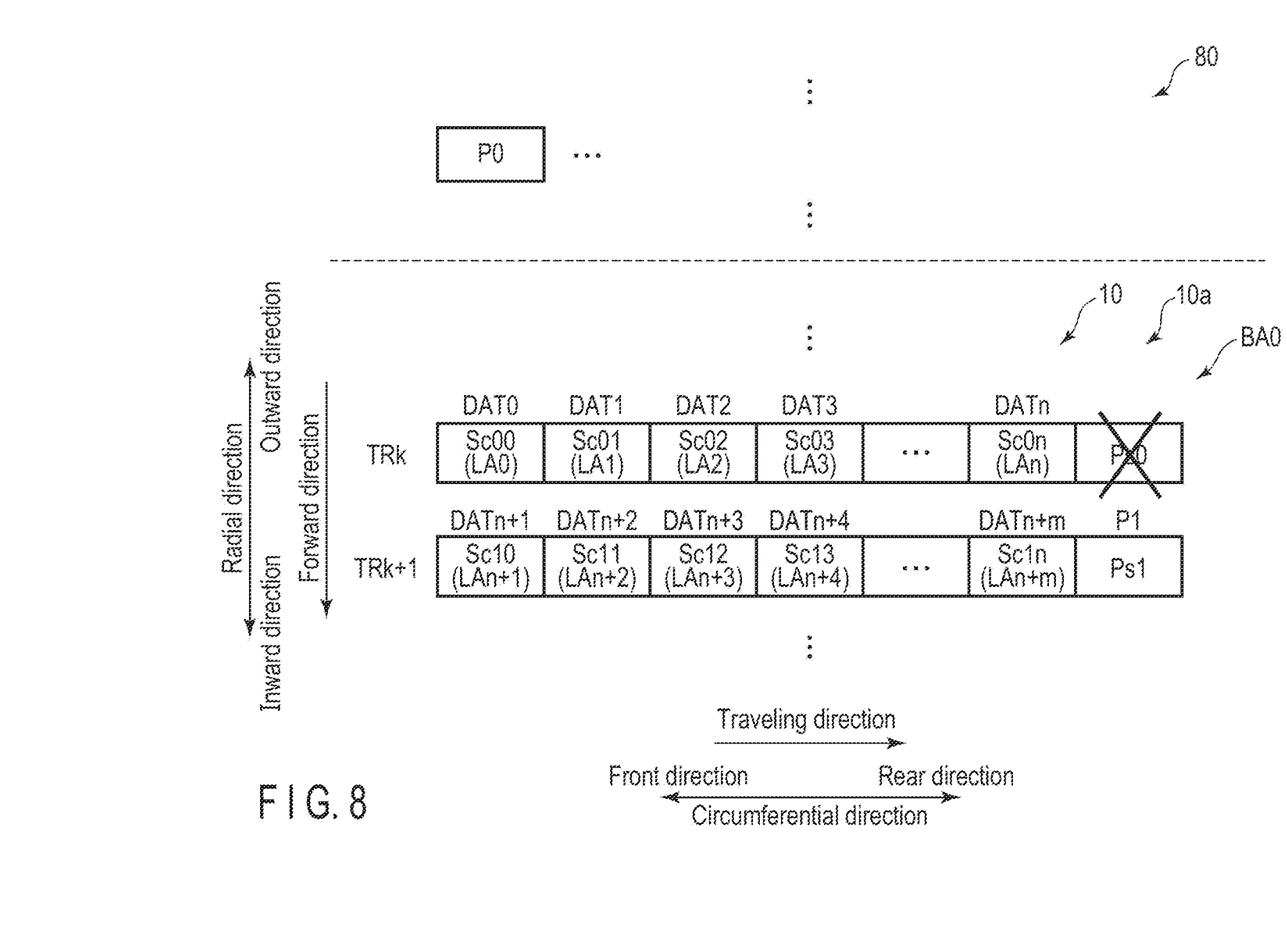
FIG. 8 is a schematic diagram illustrating an example of parity sector alternative processing according to the embodiment.

FIG. 8 is a schematic diagram illustrating an example of parity sector alternative processing according to the embodiment. FIG. 8 corresponds to FIG. 7. FIG. 8 illustrates the nonvolatile memory 80 as an alternative region. In FIG. 8, it is assumed that the number of write retries exceeds the write retry upper limit value.

In the example illustrated in FIG. 8, in a case where a write fault occurs in the parity write sector Ps0 of the track TRk and writing to the parity write sector is disabled, the MPU 60 records the parity sector P0 in (the parity recording region of) the nonvolatile memory 80.

In the example illustrated in FIG. 8, when performing the track ECC processing on the error sector of the track TRk, the MPU 60 reads the parity sector P0 from (the parity recording region of) the nonvolatile memory 80, and performs the track ECC processing on the error sector of the track TRk based on the parity sector P0.

Figure 9:
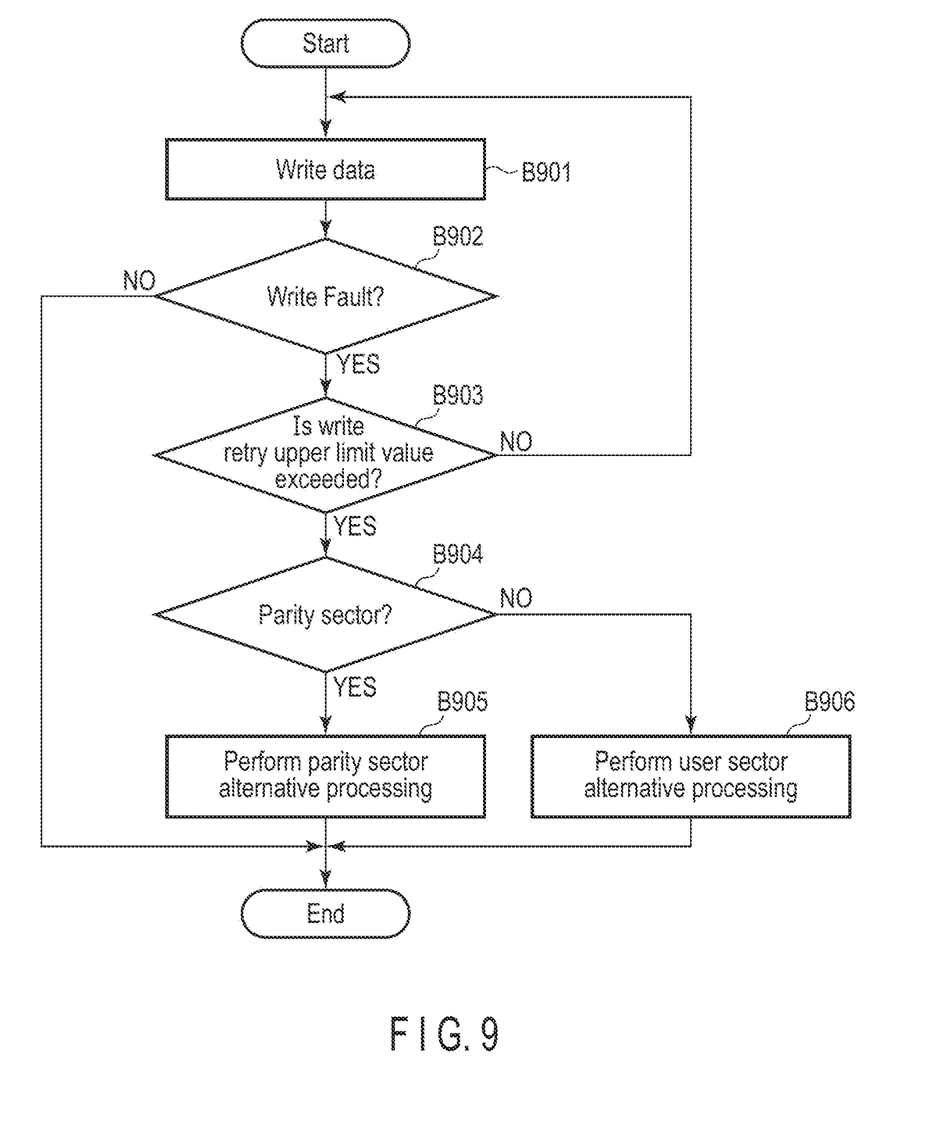
FIG. 9 is a flowchart illustrating an example of a write processing method according to the embodiment.

FIG. 9 is a flowchart illustrating an example of a write processing method according to the present embodiment.

The MPU 60 writes data in a particular sector of a particular track (B901). For example, the MPU 60 performs shingled recording of the data in a particular sector of a particular track of a particular band region. The MPU 60 determines whether a write fault occurs in the particular sector (B902). When the MPU 60 determines that the write fault does not occur in the particular sector (NO in B902), the process ends. When the MPU 60 determines that a write fault occurs in the particular sector (YES in B902), the MPU 60 determines whether the number of write retries corresponding to this track exceeds the write retry upper limit value or is equal to or less than the write retry upper limit value (B903). When the MPU 60 determines that the number of write retries corresponding to this track is equal to or less than the write retry upper limit value (NO in B903), the process proceeds to the processing of B901. When the MPU 60 determines that the number of write retries corresponding to this track exceeds the write retry upper limit value (YES in B903), the MPU 60 determines whether this particular sector is a parity write sector or not (B904). In other words, when the MPU 60 determines that the number of write retries corresponding to this track exceeds the write retry upper limit value, the MPU 60 determines whether this particular sector is a parity write sector or a user sector. When the MPU 60 determines that the particular sector is a parity sector (YES in B904), the MPU 60 performs the parity sector alternative processing (B905) and the process ends. For example, when the MPU 60 determines that the particular sector is a parity write sector, the MPU 60 records the particular fault parity sector in an alternative region, for example, (the parity recording region of) the system area 10c, and the process ends. When the MPU 60 determines that the particular sector is not a parity write sector, that is, the particular sector is a user sector (NO in B904), the MPU 60 performs the user sector alternative processing (B906) and the process ends. For example, when the MPU 60 determines that the particular sector is a user sector, the MPU 60 performs shingled recording of the fault write data from the circumferential adjacent sector of the fault sector and the user data subsequent to the fault write data, and the process ends.

Figure 10:
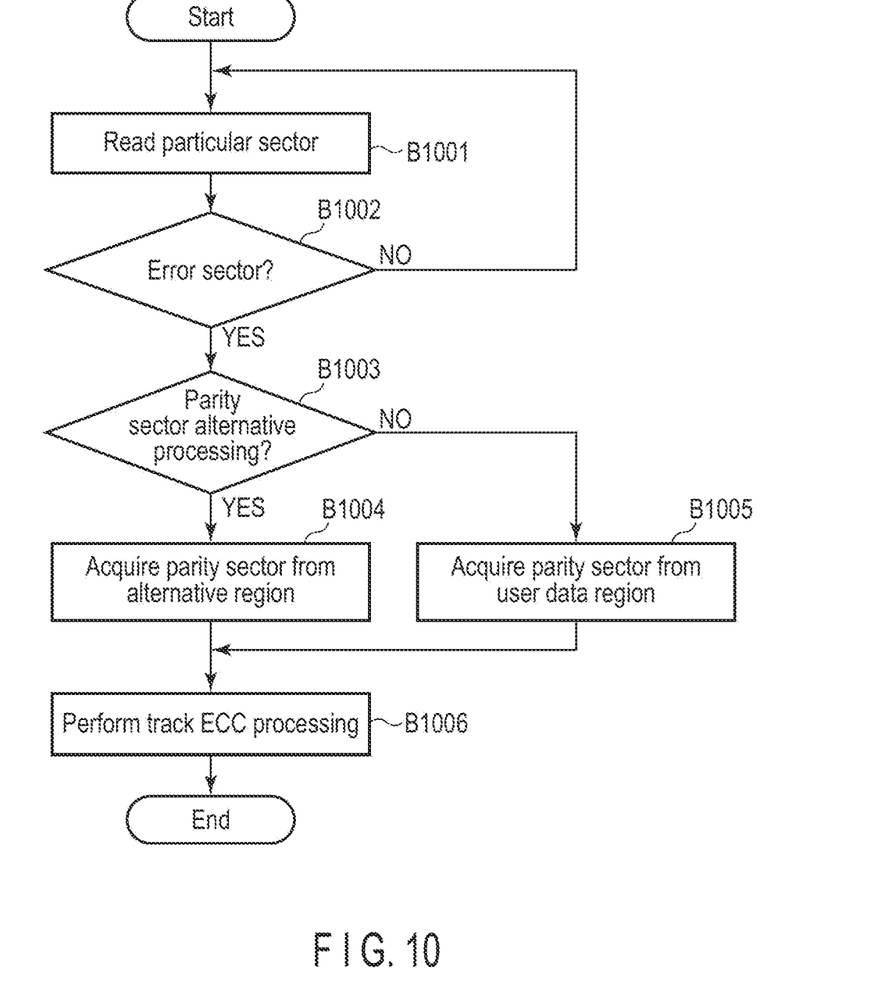
FIG. 10 is a flowchart illustrating an example of a read processing method according to the embodiment.

FIG. 10 is a flowchart illustrating an example of a read processing method according to the present embodiment.

The MPU 60 reads a particular sector of a particular track (B1001). The MPU 60 determines whether a particular sector is an error sector or not (B1002). When the MPU 60 determines that the particular sector is not an error sector (NO in B1002), the process proceeds to processing B1001. When the MPU 60 determines that the particular sector is an error sector (YES in B1002), the MPU 60 determines whether the parity sector alternative processing has been performed in this track (B1003). In other words, when the MPU 60 determines that the particular sector is an error sector, the MPU 60 determines whether the parity sector corresponding to this track is recorded in the alternative region or not. When the MPU 60 determines that the parity sector alternative processing has been performed (YES in B1003), the MPU 60 acquires the parity sector corresponding to this track from the alternative region, for example, (the parity recording region of) the system area 10c (B1004), and the process proceeds to processing of B1006. When the MPU 60 determines that the parity sector alternative processing has not been performed (NO in B1003), the MPU 60 acquires the parity sector from the parity write sector of this track of the user data region (B1005), and performs the track ECC processing on the error sector of this track based on the acquired parity sector (B1006), and the process ends.

According to the embodiment, the magnetic disk device 1 performs shingled recording of a plurality of tracks in a particular band region. When a write fault occurs in a particular sector of a particular track of the band region, the magnetic disk device 1 performs different alternative processing depending on whether the particular sector is a user sector or a parity write sector. When a write fault occurs in a fault sector (user sector) of a particular track of the band region and the number of write retries corresponding to the track exceeds a write retry upper limit value, the magnetic disk device 1 performs shingled recording of fault write data and user data subsequent to the fault data from a circumferential adjacent sector of the fault sector (performs slip sector processing). When a write fault occurs in a fault parity write sector (parity write sector) of a particular track of the band region and the number of write retries corresponding to the track exceeds the write retry upper limit value, the magnetic disk device 1 records the particular fault parity sector corresponding to the track in an alternative region, for example, (the parity recording region of) the system area 10c. The magnetic disk device 1 can hold parity sectors corresponding to all tracks in a particular band region. Therefore, the magnetic disk device 1 can perform the track ECC processing on all tracks in a particular band region. Therefore, the magnetic disk device 1 can improve the track density.

The configuration of the above-described embodiment can be applied not only to the magnetic disk device 1 of the shingled recording type but also to the magnetic disk device 1 of the normal recording type.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
 a disk;
 a head that writes data with respect to the disk and reads data from the disk; and
 a controller that overwrites a second track on a first track in a radial direction of the disk, performs first alternative processing of recording a first user sector in a first region when writing of the first user sector available by a user in the first track is disabled, and performs second alternative processing different from the first alternative processing of recording a first parity sector in a second region when writing of the first parity sector acquired by an XOR operation in the first track is disabled.

2. The magnetic disk device according to claim 1, wherein the controller performs the first alternative processing when writing of the first user sector in the first track is disabled and the number of write retries indicating times of performing write retry of writing data again exceeds an upper limit value of write retry executable times in the first track, and performs the second alternative processing when writing of the first parity sector in the first track is disabled and the number of write retries exceeds the upper limit value.

3. The magnetic disk device according to claim 1, wherein the first region is a region in which an LBA is set, and the second region is a region in which the LBA is not set.

4. The magnetic disk device according to claim 1, wherein the first alternative processing is processing of resuming write processing from a second user sector adjacent in a first direction in which data in a circumferential direction of the disk of the first user sector of the first track is written.

5. The magnetic disk device according to claim 1, wherein the first alternative processing is processing of resuming write processing from a second user sector corresponding to a second LBA subsequent to a first LBA corresponding to the first user sector of the first track.

6. The magnetic disk device according to claim 1,
 wherein the first region corresponds to a user data region available by a user of the disk, and
 the second region corresponds to a media cache of the disk in which data to be written in the user data region is temporarily written or a system area of the disk in which information necessary for system management is written.

7. The magnetic disk device according to claim 1, further comprising
 a nonvolatile memory,
 wherein the first region corresponds to a user data region available by a user of the disk, and
 the second region corresponds to the nonvolatile memory.

8. The magnetic disk device according to claim 1, wherein the controller performs error correction on a third user sector that cannot be read in the first track based on the first parity sector read from the second region.

9. A magnetic disk device comprising:
a disk;
a head that writes data with respect to the disk and reads data from the disk; and
a controller that records a first user sector in a first region available by a user when writing of the first user sector available by a user of a first track of the disk is disabled and the number of write retries indicating times of performing write retry of writing data again exceeds an upper limit value of write retry executable times in the first track, and records a first parity sector in a second region different from the first region when writing of the first parity sector acquired by an XOR operation in the first track is disabled and the number of write retries exceeds the upper limit value.

10. The magnetic disk device according to claim 9, wherein the controller writes the first user sector in a second user sector corresponding to a second LBA subsequent to a first LBA of the first user sector when writing of the first user sector is disabled.

11. The magnetic disk device according to claim 9, wherein the first region is a region in which an LBA is set, and the second region is a region in which the LBA is not set.

12. The magnetic disk device according to claim 11,
wherein the first region corresponds to a user data region available by a user of the disk, and
the second region corresponds to a media cache of the disk in which data to be written in the user data region is temporarily written or a system area of the disk in which information necessary for system management is written.

13. A read/write processing method that is applied to a magnetic disk device comprising a disk, and a head that writes data with respect to the disk and reads data from the disk, the read/write processing method comprising:
overwriting a second track on a first track in a radial direction of the disk;
performing first alternative processing of recording a first user sector in a first region when writing of the first user sector available by a user in the first track is disabled; and
performing second alternative processing different from the first alternative processing of recording a first parity sector in a second region when writing of the first parity sector acquired by an XOR operation in the first track is disabled.

14. The read/write processing method according to claim 13, further comprising:
performing the first alternative processing when writing of the first user sector in the first track is disabled and the number of write retries indicating times of performing write retry of writing data again exceeds an upper limit value of write retry executable times in the first track; and
performing the second alternative processing when writing of the first parity sector in the first track is disabled and the number of write retries exceeds the upper limit value.

15. The read/write processing method according to claim 13,
wherein the first region is a region in which an LBA is set, and
the second region is a region in which the LBA is not set.

16. The read/write processing method according to claim 13, wherein the first alternative processing is processing of resuming write processing from a second user sector adjacent in a first direction in which data in a circumferential direction of the disk of the first user sector of the first track is written.

17. The read/write processing method according to claim 13, wherein the first alternative processing is processing of resuming write processing from a second user sector corresponding to a second LBA subsequent to a first LBA corresponding to the first user sector of the first track.

18. The read/write processing method according to claim 13,
wherein the first region corresponds to a user data region available by a user of the disk, and
the second region corresponds to a media cache of the disk in which data to be written in the user data region is temporarily written or a system area of the disk in which information necessary for system management is written.

19. The read/write processing method according to claim 13,
wherein the magnetic disk device further comprises a nonvolatile memory,
the first region corresponds to a user data region available by a user of the disk, and
the second region corresponds to the nonvolatile memory.

20. The read/write processing method according to claim 13, further comprising performing error correction on a third user sector that cannot be read in the first track based on the first parity sector read from the second region.

* * * * *